United States Patent
Fukushima et al.

(10) Patent No.: US 12,451,566 B2
(45) Date of Patent: Oct. 21, 2025

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); ENVISION AESC JAPAN LTD., Kanagawa (JP)

(72) Inventors: Naoki Fukushima, Mie (JP); Osamu Nakayama, Mie (JP); Katsushi Miyazaki, Mie (JP); Mitsutoshi Morita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); ENVISION AESC JAPAN LTD., Kanagawa (JP)

( * ) Notice: Subject to any disclaimer, the term of this patent is extended or adjusted under 35 U.S.C. 154(b) by 520 days.

(21) Appl. No.: 18/016,077

(22) PCT Filed: Jul. 5, 2021

(86) PCT No.: PCT/JP2021/025251
§ 371 (c)(1),
(2) Date: Jan. 13, 2023

(87) PCT Pub. No.: WO2022/014385
PCT Pub. Date: Jan. 20, 2022

(65) Prior Publication Data
US 2023/0275326 A1 Aug. 31, 2023

(30) Foreign Application Priority Data
Jul. 17, 2020 (JP) .................................. 2020-122549

(51) Int. Cl.
H01M 50/507 (2021.01)
H01M 50/289 (2021.01)
H01M 50/296 (2021.01)

(52) U.S. Cl.
CPC ....... H01M 50/507 (2021.01); H01M 50/289 (2021.01); H01M 50/296 (2021.01)

(58) Field of Classification Search
CPC ............. H01M 50/289; H01M 50/296; H01M 50/507; H01M 50/517; H01M 50/529; H01M 50/543
See application file for complete search history.

(56) References Cited

U.S. PATENT DOCUMENTS

| 2016/0093862 A1 | 3/2016 | DeKeuster et al. |
| 2016/0268579 A1* | 9/2016 | Ichikawa ............ H01M 50/507 |

(Continued)

FOREIGN PATENT DOCUMENTS

| EP | 3016176 A1 * | 5/2016 | .......... H01M 10/425 |
| JP | 2002008627 A * | 1/2002 | .......... H01M 50/502 |

(Continued)

OTHER PUBLICATIONS

International Search Report issued in International Patent Application No. PCT/JP2021/025251, dated Sep. 21, 2021, together with English translation thereof.

*Primary Examiner* — Amanda C. Walke
(74) *Attorney, Agent, or Firm* — Greenblum & Bernstein, P.L.C.

(57) ABSTRACT

A wiring module is attached to an electricity storage element group including a plurality of electricity storage elements aligned. The wiring module includes: a plurality of busbars connected to electrodes of the plurality of electricity storage elements; and an insulating protector that is insulating, holds the plurality of busbars, and is attached to a case containing (Continued)

the electricity storage element group. The insulating protector has a positioning portion engaging with the case.

6 Claims, 11 Drawing Sheets

(56) References Cited

U.S. PATENT DOCUMENTS

| | | | |
|---|---|---|---|
| 2016/0359309 A1* | 12/2016 | Nakayama | H01M 50/507 |
| 2019/0052035 A1* | 2/2019 | Fukushima | H01M 50/507 |
| 2020/0020914 A1* | 1/2020 | Fukushima | H01M 50/507 |
| 2020/0144580 A1 | 5/2020 | Hong et al. | |

FOREIGN PATENT DOCUMENTS

| | | |
|---|---|---|
| JP | 2006-172882 | 6/2006 |
| WO | 2018/062226 | 4/2018 |

* cited by examiner

WIRING MODULE

TECHNICAL FIELD

The present disclosure relates to a wiring module.

BACKGROUND ART

As an electrical-device assembly including a plurality of electricity storage elements, an electrical-device assembly described in Japanese Unexamined Patent Application Publication No. 2006-172882 is conventionally known. The electricity storage element includes a laminating-film cover. The electricity storage elements are individually contained in respective cell cases. Battery cells in which the electricity storage elements are contained in the cell cases are stacked. The plurality of electricity storage elements is positioned by the cell cases individually attached to the respective electricity storage elements.

CITATIONS LIST

Patent Literature

Patent Literature 1: Japanese Unexamined Patent Application Publication No. 2006-172882

SUMMARY OF INVENTION

Technical Problems

According to the above technique, since the electricity storage elements are individually contained in the respective cell cases, there occurs a problem that the number of components increases.

The present disclosure has been completed on the basis of the above circumstances, and an object of the present disclosure is to provide a wiring module in which the number of components is reduced.

Solutions to Problems

The present disclosure is a wiring module attached to an electricity storage element group including a plurality of electricity storage elements aligned. The wiring module includes: a plurality of busbars connected to electrodes of the plurality of electricity storage elements; and an insulating protector that is insulating, holds the plurality of busbars, and is attached to a case containing the electricity storage element group. The insulating protector has a positioning portion engaging with the case.

Effects of Invention

According to the present disclosure, the number of components of the wiring module can be reduced.

DESCRIPTION OF EMBODIMENTS

Description of Embodiments of Present Disclosure

First, aspects of the present disclosure will be listed and described.

(1) The present disclosure is a wiring module attached to an electricity storage element group including a plurality of electricity storage elements aligned. The wiring module includes: a plurality of busbars connected to electrodes of the plurality of electricity storage elements; and an insulating protector that is insulating, holds the plurality of busbars, and is attached to a case containing the electricity storage element group. The insulating protector has a positioning portion engaging with the case.

The positioning portion of the insulating protector is engaged with the case, so that the insulating protector can be positioned for the case. Thus, the plurality of electricity storage elements held by the insulating protector via the busbars can be positioned for the case. As described above, according to the present disclosure, the plurality of electricity storage elements can be positioned without using members attached to the plurality of electricity storage elements, respectively, to perform the positioning, and thus the number of components can be reduced.

(2) Preferably, the positioning portion is provided in a projection shape or a recess shape from the insulating protector, and the positioning portion recess-projection-fits to a positioning-receiving portion provided at a position on the case corresponding to the positioning portion.

The insulating protector can be positioned for the case by a simple method in which the positioning portion and the positioning-receiving portion are recess-projection-fitted to each other.

(3) Preferably, the insulating protector is provided with a side positioning portion, as the positioning portion, at a side of the insulating protector, and the case is provided with a side positioning-receiving portion, as the positioning-receiving portion, at a side wall of the case.

The side positioning portion and the side positioning-receiving portion are recess-projection-fitted to each other, so that inner walls of the side positioning-receiving portion are in contact, from above and below, with the side positioning portion. Thus, the insulating protector can be positioned with respect to an up-down direction.

(4) Preferably, the insulating protector is provided with an upper positioning portion, as the positioning portion, at an upper portion of the insulating protector, and the case is provided with an upper positioning-receiving portion, as the positioning-receiving portion, at an upper wall of the case.

The upper positioning portion and the upper positioning-receiving portion are recess-projection-fitted to each other, so that inner walls of the upper positioning-receiving portion are laterally in contact with the upper positioning portion. Thus, the insulating protector can be positioned with respect to a left-right direction.

(5) Preferably, the case includes: a containing portion having an opening portion that opens forward or rearward; and a lid attached to the containing portion to close the opening portion, and the insulating protector is held between the lid and the containing portion.

The insulating protector is held between the containing portion and the lid, so that the insulating protector is positioned with respect to a front-rear direction.

Details of Embodiments of Present Disclosure

Hereinafter, embodiments of the present disclosure will be described. It is intended that the present disclosure is not limited to these examples, but is indicated by the claims, and includes all modifications within the meaning equivalent to the claims and the scope of the claims.

First Embodiment

A first embodiment in which a wiring module 10 according to the present disclosure is applied to an electricity storage module 11 will be described with reference to FIGS. 1 to 11. The electricity storage module 11 is mounted on a vehicle (not illustrated), such as an electric car or a hybrid car, to be used as a driving source. The electricity storage module 11 according to the present embodiment includes a case 13, a plurality of electricity storage elements 12 contained in the case 13, and the wiring module 10 attached to the plurality of electricity storage elements 12. The wiring module 10 includes a plurality of busbars 26 connected to lead terminals 24 (an example of electrodes) of the plurality of electricity storage elements 12, and a front insulating protector 14 (an example of an insulating protector) holding the plurality of busbars 26 and attached to the case 13. In the following description, a direction indicated by an arrow line Z is an upward direction, a direction indicated by an arrow line Y is a forward direction, and a direction indicated by an arrow line X is a leftward direction. For a plurality of the same members, only some of the members may be denoted by a reference sign, and the reference sign of the other members may be omitted. An up-down direction, a left-right direction, and a front-rear direction are orthogonal to each other.

[Overall Structure]

Figure 1:
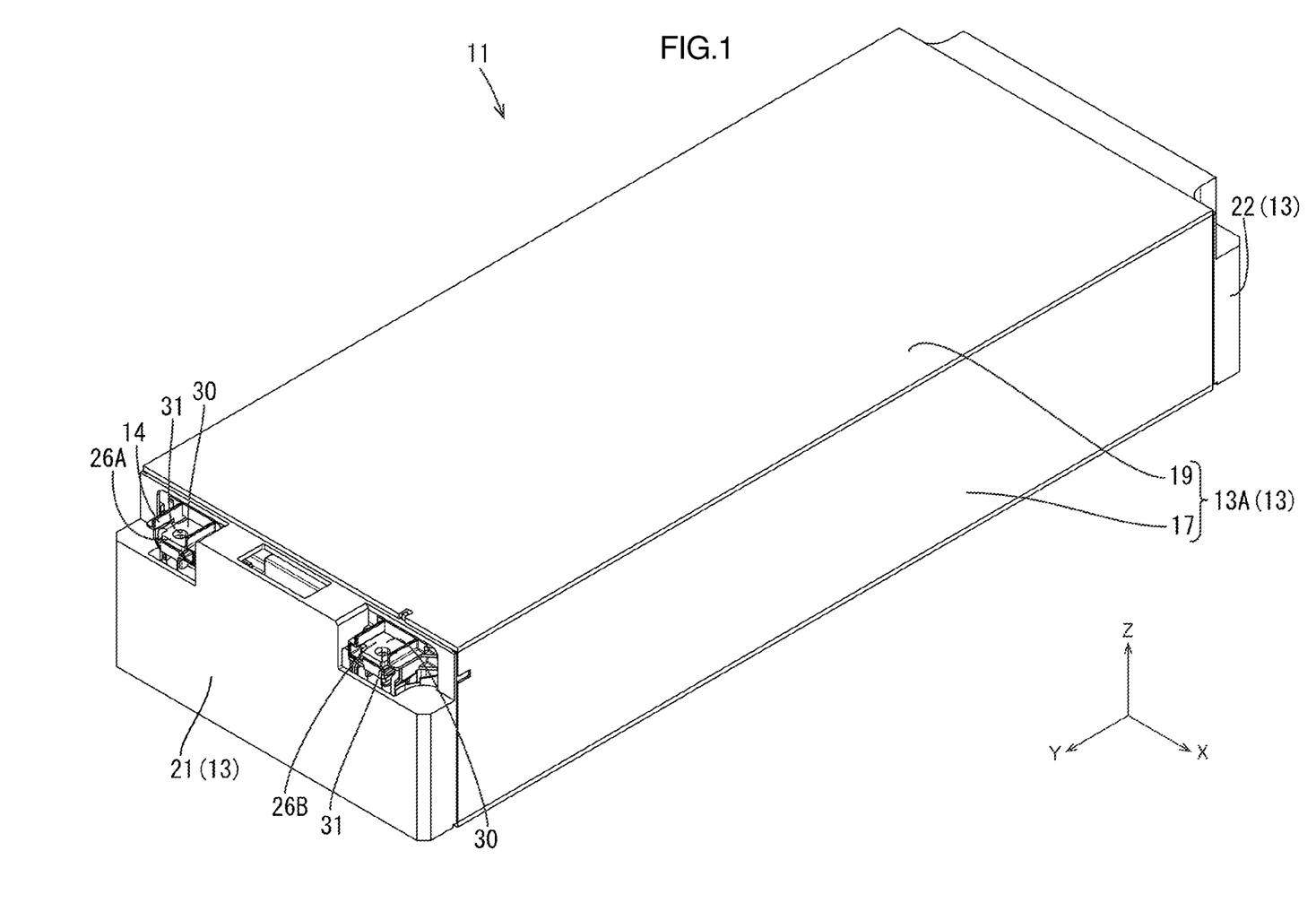
FIG. 1 is a perspective view illustrating an electricity storage module according to a first embodiment.
Figure 2:
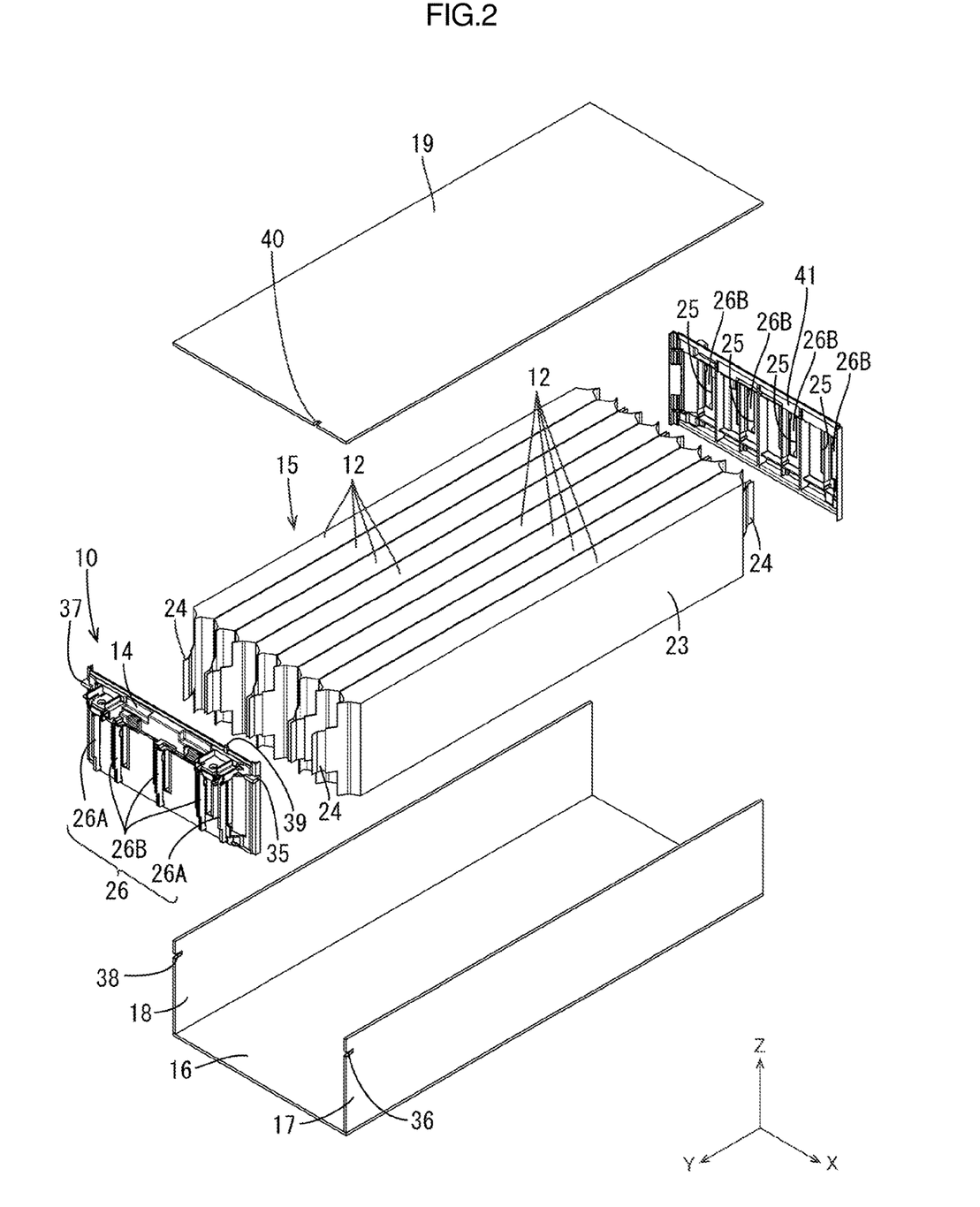
FIG. 2 is an exploded perspective view illustrating the electricity storage module in which a front lid and a rear lid are omitted.

As illustrated in FIG. 1, the electricity storage module 11 has a substantially rectangular-parallelepiped shape elongated in the front-rear direction. As illustrated in FIG. 2, the electricity storage module 11 includes an electricity storage element group 15 contained in the case 13 and including the plurality of electricity storage elements 12 aligning in the left-right direction. The case 13 includes a containing portion 13A that is metallic, a front lid 21 (an example of a lid) attached to a front end portion of the containing portion 13A, and a rear lid 22 (an example of the lid) attached to a rear end portion of the containing portion 13A. The containing portion 13A as a whole has a rectangular-tube shape having opening portions 20 that open forward and rearward, respectively. As a metal of which the containing portion 13A is made, any metal, such as aluminum, an aluminum alloy, or stainless steel, can be appropriately selected.

The containing portion 13A has a bottom wall 16, a left wall 17 extending upward from a left edge of the bottom wall 16, a right wall 18 extending upward from a right edge of the bottom wall 16, and an upper wall 19 coupling an upper end edge of the left wall 17 and an upper end edge of the right wall 18. The bottom wall 16, the left wall 17, the right wall 18, and the upper wall 19 have a rectangular shape elongated in the front-rear direction.

The upper wall 19 is welded to the upper end edge of the left wall 17 and the upper end edge of the right wall 18 by a publicly known method, such as laser welding, electric resistance welding, or arc welding. The bottom wall 16, the left wall 17, and the right wall 18 may be connected by welding. Alternatively, the bottom wall 16, the left wall 17, and the right wall 18 may be formed by bending a single metal plate. Alternatively, a long metal member having a U-shaped cross section may be formed by extrusion, and cut into a predetermined length.

As illustrated in FIG. 1, the front lid 21 (an example of the lid) is attached to the front end portion of the containing portion 13A. The front lid 21 closes the front opening portion 20 of the containing portion 13A. The rear lid 22 is attached to the rear end portion of the containing portion 13A. The rear lid 22 closes the rear opening portion 20 of the containing portion 13A.

[Electricity Storage Elements 12]

As illustrated in FIG. 2, the electricity storage element 12 includes an electricity generation element (not illustrated) contained in a laminating-film cover 23. An edge portion of a laminating film constituting the laminating-film cover 23 is thermally welded. The lead terminals 24 protrude forward and rearward from a front end portion and a rear end portion of the laminating-film cover 23, respectively. The front lead terminal 24 and the rear lead terminal 24 have different polarities. One of the front lead terminal 24 and the rear lead terminal 24 is a positive electrode terminal, and the other is a negative electrode terminal.

The electricity storage element 12 as a whole is formed in a plate shape elongated in the front-rear direction. The plurality of (eight in the present embodiment) electricity storage elements 12 is aligned in the left-right direction to form the one electricity storage element group 15. In the electricity storage element group 15, the electricity storage elements 12 are aligned such that the lead terminals 24 adjacent to each other in the left-right direction have different polarities.

[Front Insulating Protector 14]

Figure 3:
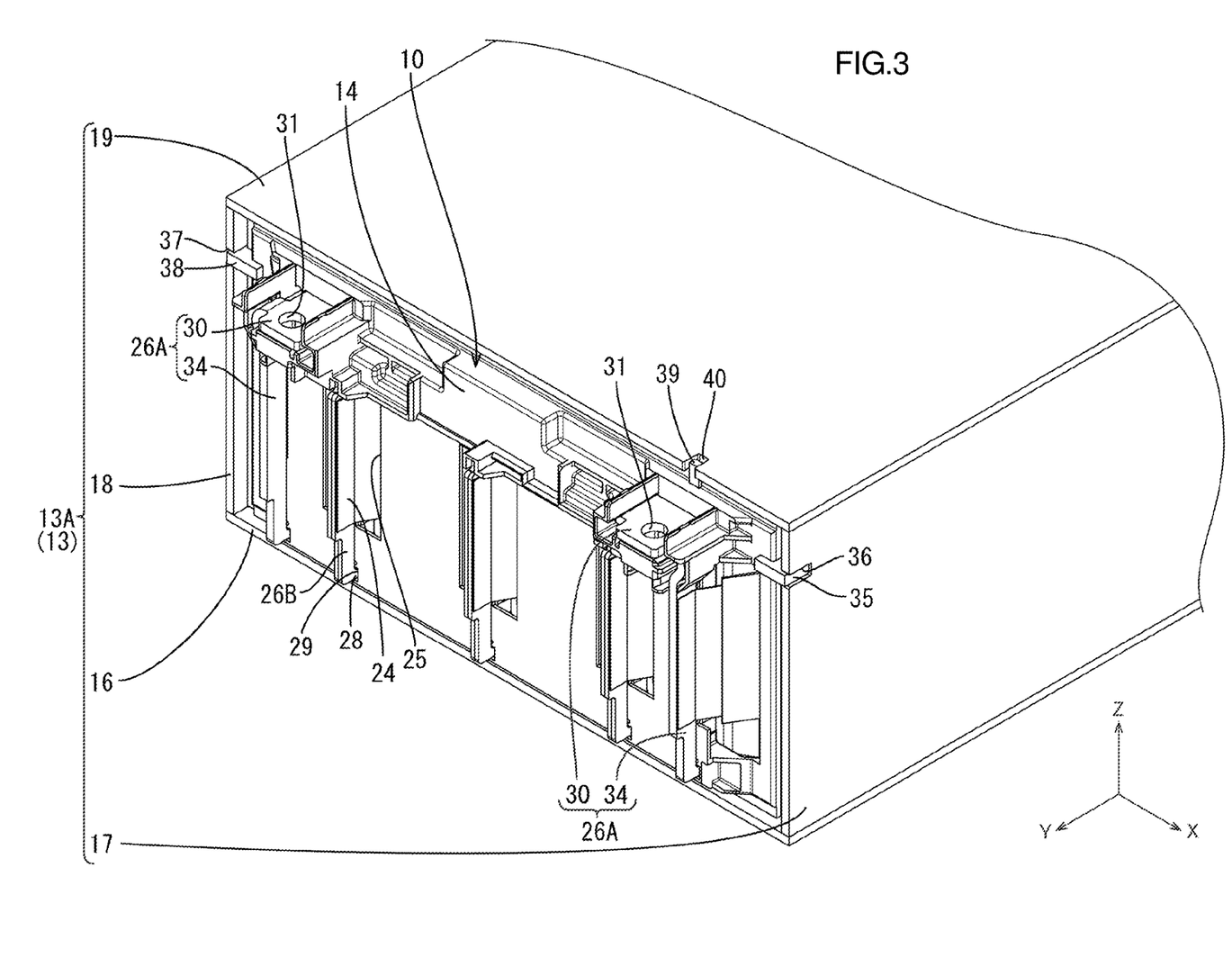
FIG. 3 is a partially enlarged perspective view illustrating a wiring module attached to a case.
Figure 4:
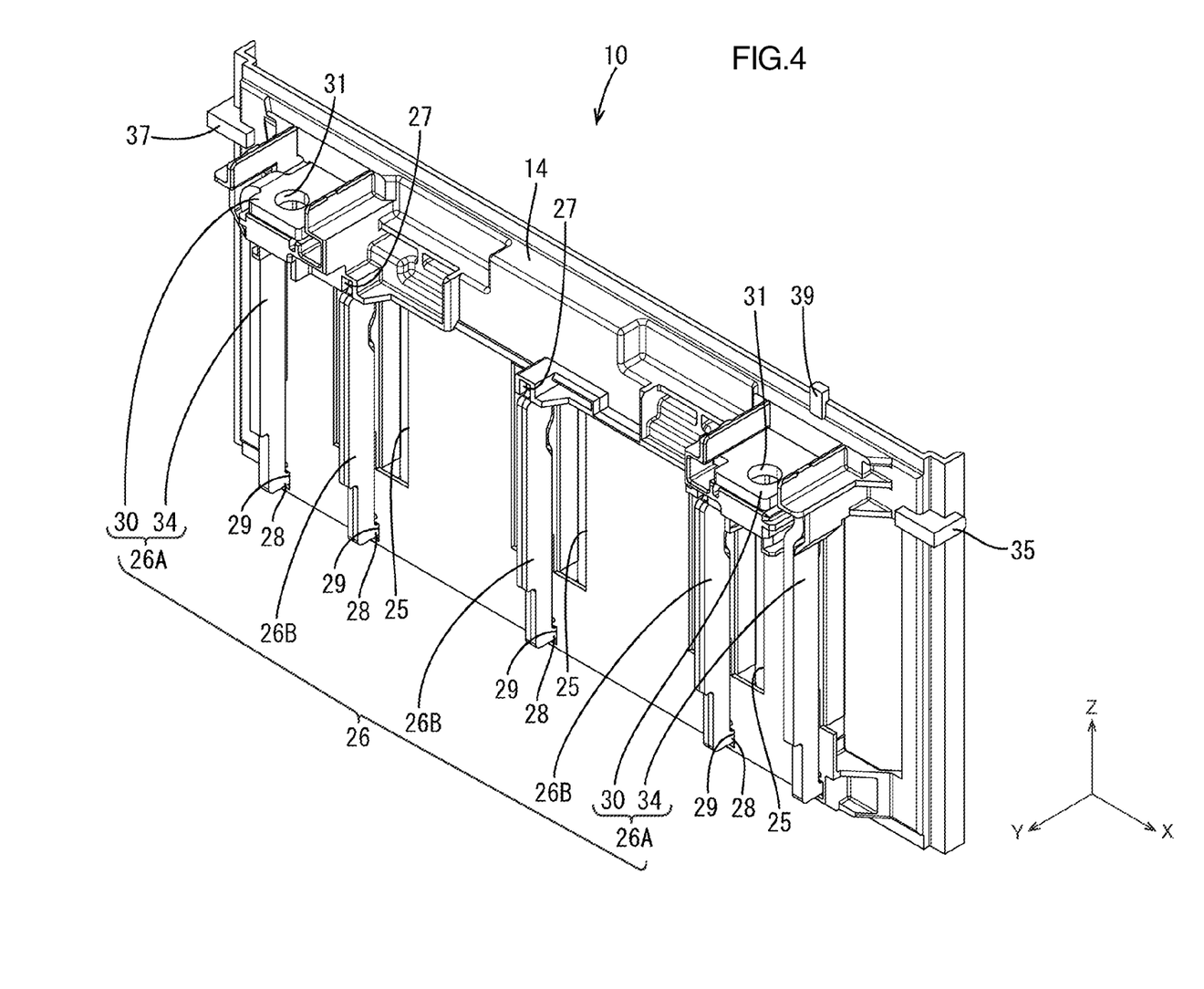
FIG. 4 is a perspective view illustrating the wiring module.
Figure 5:
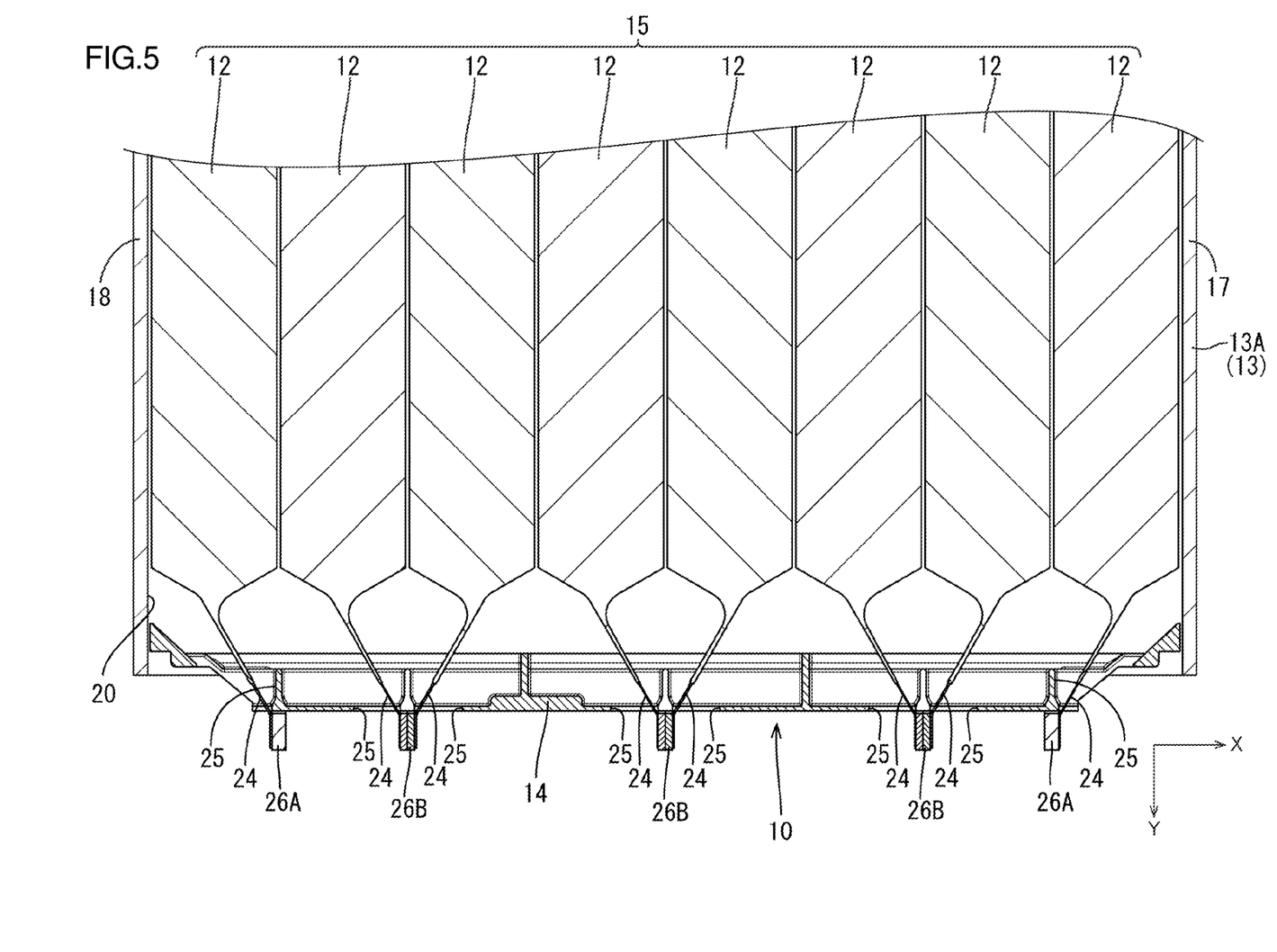
FIG. 5 is a cross-sectional view taken along line V-V in FIG. 8.

As illustrated in FIG. 3, the front insulating protector 14 that closes, from the front, the opening portion 20 is attached to the front end portion of the containing portion 13A. The front insulating protector 14 is formed by injection-molding an insulating synthetic resin material. As illustrated in FIG. 4, the front insulating protector 14 as a whole is formed in a plate shape that is rectangular when viewed in the front-rear direction. As illustrated in FIG. 5, in the front insulating protector 14, a plurality of (eight in the present embodiment) slits 25 extending in the up-down direction is formed at intervals in the left-right direction. The lead terminals 24 of the electricity storage elements 12 are inserted in the slits 25 from the rear to the front.

As illustrated in FIG. 4, on the front insulating protector 14, the plurality of busbars 26 made of a metal plate is attached to positions near the slits 25. An upper end portion of the busbar 26 is held between a holding portion 27 formed on the front insulating protector 14 and having a groove shape. A protrusion 28 protruding rearward is formed at a lower end portion of the busbar 26. The protrusion 28 is inserted, from the front, in a fixing hole 29 provided with the front insulating protector 14.

Among the busbars 26, the busbars 26 located at the left end portion and the right end portion are output busbars 26A electrically connected to an external circuit. Formed at an upper end portion of the output busbar 26A is an output terminal portion 30 to which an external busbar 33 constituting the external circuit is connected. Formed through the output terminal portion 30 is a through hole 31 that is through in the up-down direction. A bolt 32 is inserted in the through hole 31, and the bolt 32 is screwed in a nut (not illustrated), so that the output busbar 26A and the external busbar 33 are electrically connected (see FIG. 6).

As illustrated in FIG. 4, the output busbar 26A has a connection portion 34 having a plate shape elongated in the up-down direction. As illustrated in FIG. 5, in a region in front of the front insulating protector 14, the lead terminals 24 inserted, from the rear, through the slits 25 are electrically connected to the connection portions 34. The connection portions 34 and the lead terminals 24 are connected by a publicly known technique, such as welding, soldering, or brazing. In the present embodiment, the connection portions 34 and the lead terminals 24 are connected by laser welding.

Among the five busbars 26, the three busbars 26 different from the output busbar 26A are connection busbars 26B. The connection busbars 26B are formed in a plate shape elongated in the up-down direction. As illustrated in FIG. 5, in a region in front of the front insulating protector 14, the lead terminals 24 inserted, from the rear, through the slits 25 are electrically connected to the connection busbars 26B. The connection busbars 26B and the lead terminals 24 are connected by a publicly known technique, such as welding, soldering, or brazing. In the present embodiment, the connection busbars 26B and the lead terminals 24 are connected by laser welding.

Figure 7:
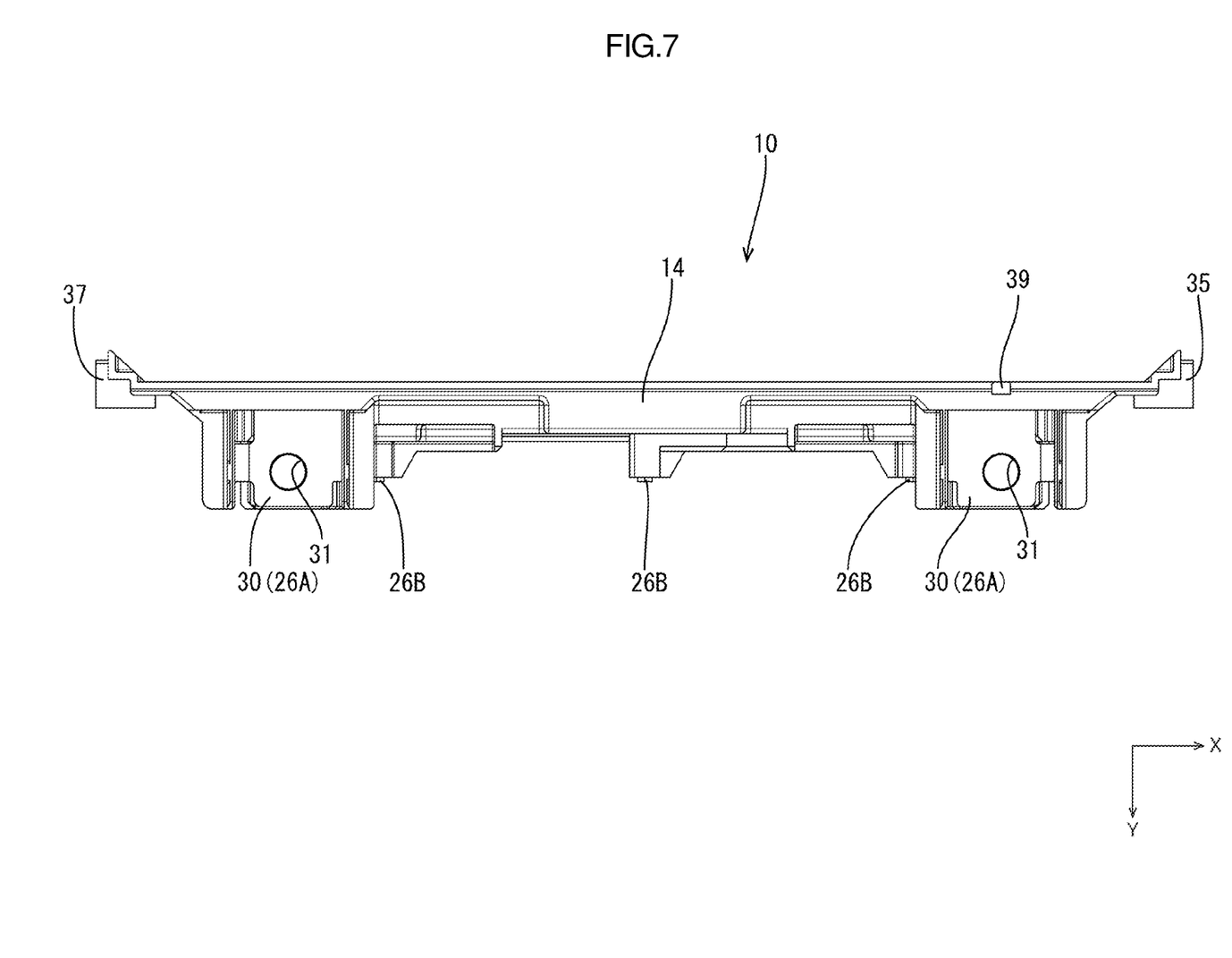
FIG. 7 is a plan view illustrating the wiring module.

As illustrated in FIG. 7, on a left end portion of the front insulating protector 14, formed at a position close to the upper end portion is a left positioning portion 35 (an example of a positioning portion and an example of a side positioning portion) protruding leftward and forward in a projection shape. The left positioning portion 35 has a rectangular shape extending in the front-rear direction when viewed from the left.

As illustrated in FIG. 3, on a front end portion of the left wall 17 of the containing portion 13A, formed at a position corresponding to the left positioning portion 35 is a left positioning-receiving portion 36 (an example of a positioning-receiving portion and an example of a side positioning-receiving portion) that dips, in a recess shape, rearward from an opening edge of the opening portion 20. The left positioning portion 35 is fitted, from the front, in the left positioning-receiving portion 36. In other words, the up-down-direction span dimension of the left positioning-receiving portion 36 is set equal to or slightly larger than the up-down-direction height dimension of the left positioning portion 35 (see FIG. 8).

As illustrated in FIG. 7, on a right end portion of the front insulating protector 14, formed at a position close to the upper end portion is a right positioning portion 37 (an example of the positioning portion and an example of the side positioning portion) protruding rightward and forward in a projection shape. The right positioning portion 37 has a rectangular shape extending in the front-rear direction when viewed from the right.

As illustrated in FIG. 3, on a front end portion of the right wall 18 of the containing portion 13A, formed at a position corresponding to the right positioning portion 37 is a right positioning-receiving portion 38 (an example of the positioning-receiving portion and an example of the side positioning-receiving portion) that dips, in a recess shape, rearward from an opening edge of the opening portion 20. The right positioning portion 37 is fitted, from the front, in the right positioning-receiving portion 38. Although not illustrated in detail, the up-down-direction span dimension of the right positioning-receiving portion 38 is set equal to or slightly larger than the up-down-direction height dimension of the right positioning portion 37.

Figure 8:
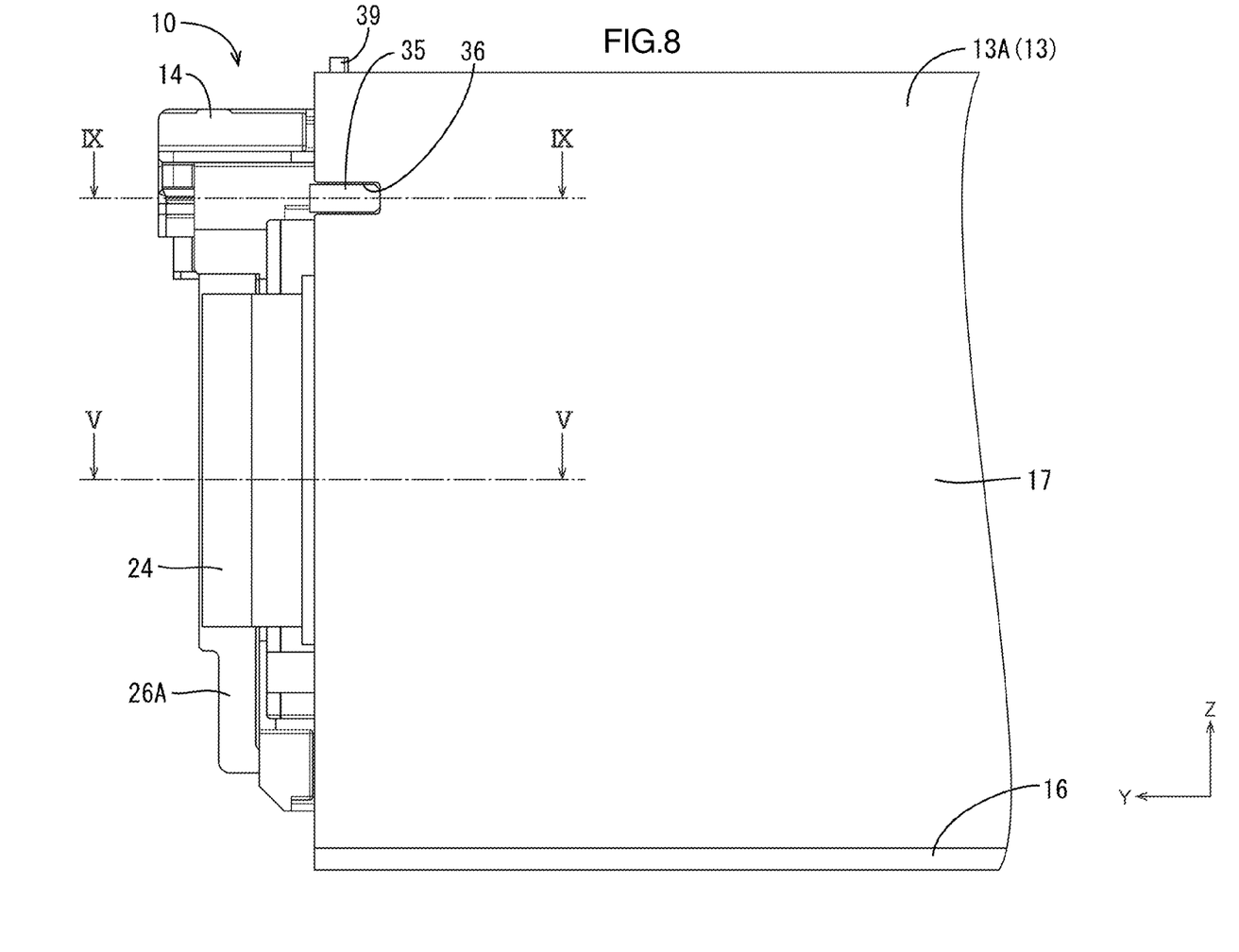
FIG. 8 is a partially enlarged side view illustrating the electricity storage module in which the front lid is omitted.
Figure 9:
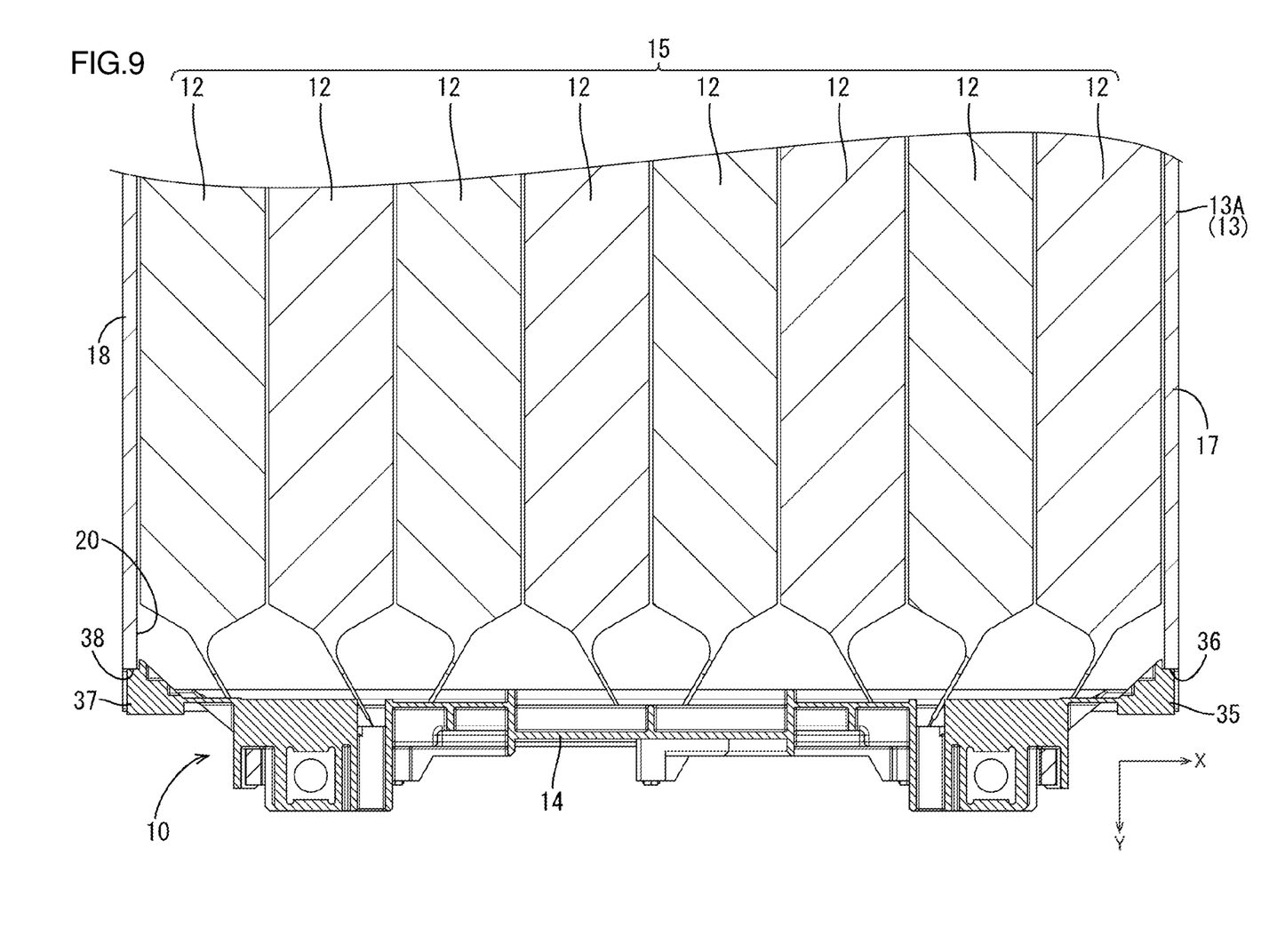
FIG. 9 is a cross-sectional view taken along line IX-IX in FIG. 8.

In a state where the front insulating protector 14 is assembled with the containing portion 13A, a rear end portion of the left positioning portion 35 is in contact with, from the front, a rear wall of the left positioning-receiving portion 36 (see FIGS. 8 and 9). A rear end portion of the right positioning portion 37 is in contact with, from the front, a rear wall of the right positioning-receiving portion 38 (see FIG. 9). Thus, the front insulating protector 14 is held in a state where the front insulating protector 14 is positioned for the case 13 with respect to the rear.

Figure 6:
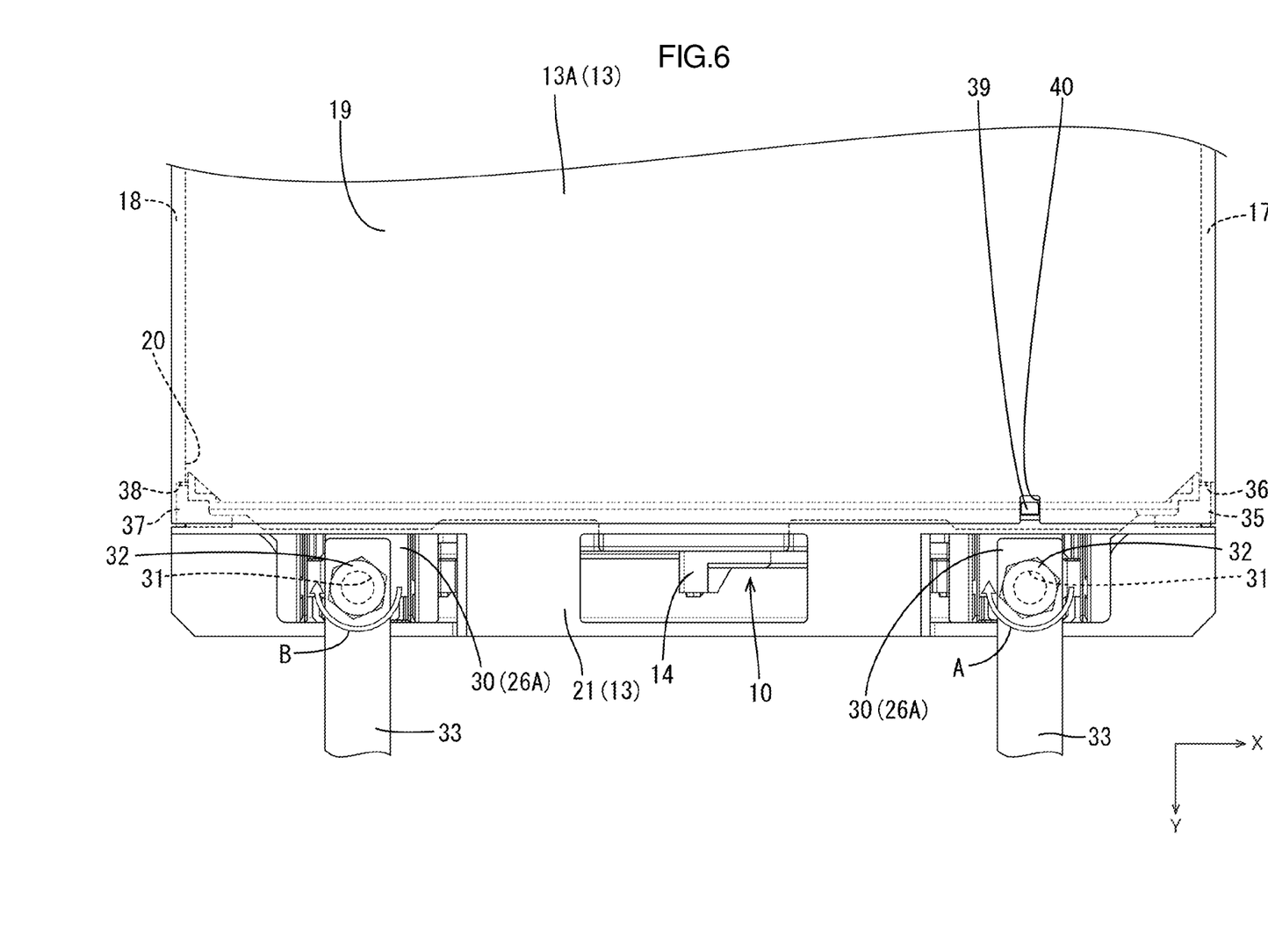
FIG. 6 is a partially enlarged plan view illustrating the electricity storage module to which external busbars are attached.

As illustrated in FIG. 6, in a state where the front lid 21 is attached to the front end portion of the containing portion 13A, the front lid 21 is in contact with, from the front, the left positioning portion 35 and the right positioning portion 37 of the front insulating protector 14. Thus, the front insulating protector 14 is held between the containing portion 13A and the front lid 21. As a result, the front insulating protector 14 is held in a state where the front insulating protector 14 is positioned for the case 13 with respect to the front.

As illustrated in FIG. 4, on an upper end portion of the front insulating protector 14, formed at a position close to the left end portion is an upper positioning portion 39 (an example of the positioning portion) protruding upward in a projection shape. The upper positioning portion 39 is formed in a rectangular shape extending in the up-down direction when viewed from the front.

As illustrated in FIG. 3, on a front end portion of the upper wall 19 of the containing portion 13A, formed at a position corresponding to the upper positioning portion 39 is an upper positioning-receiving portion 40 (an example of the positioning-receiving portion) that dips, in a recess shape, rearward from an opening edge of the opening portion 20. The upper positioning portion 39 is fitted, from the front, in the upper positioning-receiving portion 40. In other words, the left-right-direction span dimension of the upper positioning-receiving portion 40 is set equal to or slightly larger than the left-right-direction width dimension of the upper positioning portion 39 (see FIG. 6).

[Rear Insulating Protector 41]

As illustrated in FIG. 2, a rear insulating protector 41 that closes, from the rear, the opening portion 20 is attached to a rear end portion of the containing portion 13A. The rear insulating protector 41 is formed by injection-molding an insulating synthetic resin material. The rear insulating protector 41 as a whole is formed in a plate shape that is rectangular when viewed in the front-rear direction. In the rear insulating protector 41, a plurality of (eight in the present embodiment) slits 25 extending in the up-down direction is formed at intervals in the left-right direction. The lead terminals 24 of the electricity storage elements 12 are inserted in the slits 25 from the front to the rear.

On the rear insulating protector 41, a plurality of connection busbars 26B made of a metal plate is attached to positions near the slits 25. In a region behind the rear insulating protector 41, the lead terminals 24 inserted, from the front, through the slits 25 are electrically connected to the connection busbars 26B. The connection busbars 26B and the lead terminals 24 are connected by a publicly known technique, such as welding, soldering, or brazing. In the present embodiment, the connection busbars 26B and the lead terminals 24 are connected by laser welding.

[Manufacturing Method of Present Embodiment]

Subsequently, an example of a method for manufacturing the electricity storage module 11 according to the present embodiment will be described. Methods for manufacturing the electricity storage module 11 are not limited to the following description.

A front insulating protector 14 and a rear insulating protector 41 are formed by injection-molding a synthetic resin material. Output busbars 26A and connection busbars 26B are assembled with the front insulating protector 14. Connection busbars 26B are assembled with the rear insulating protector 41 (see FIG. 4).

A bottom wall 16, a left wall 17, and a right wall 18 cut into predetermined shapes are welded by laser. Thus, a metal member having the bottom wall 16, the left wall 17, and the right wall 18, and having a groove shape that opens upward is formed (see FIG. 10).

Figure 10:
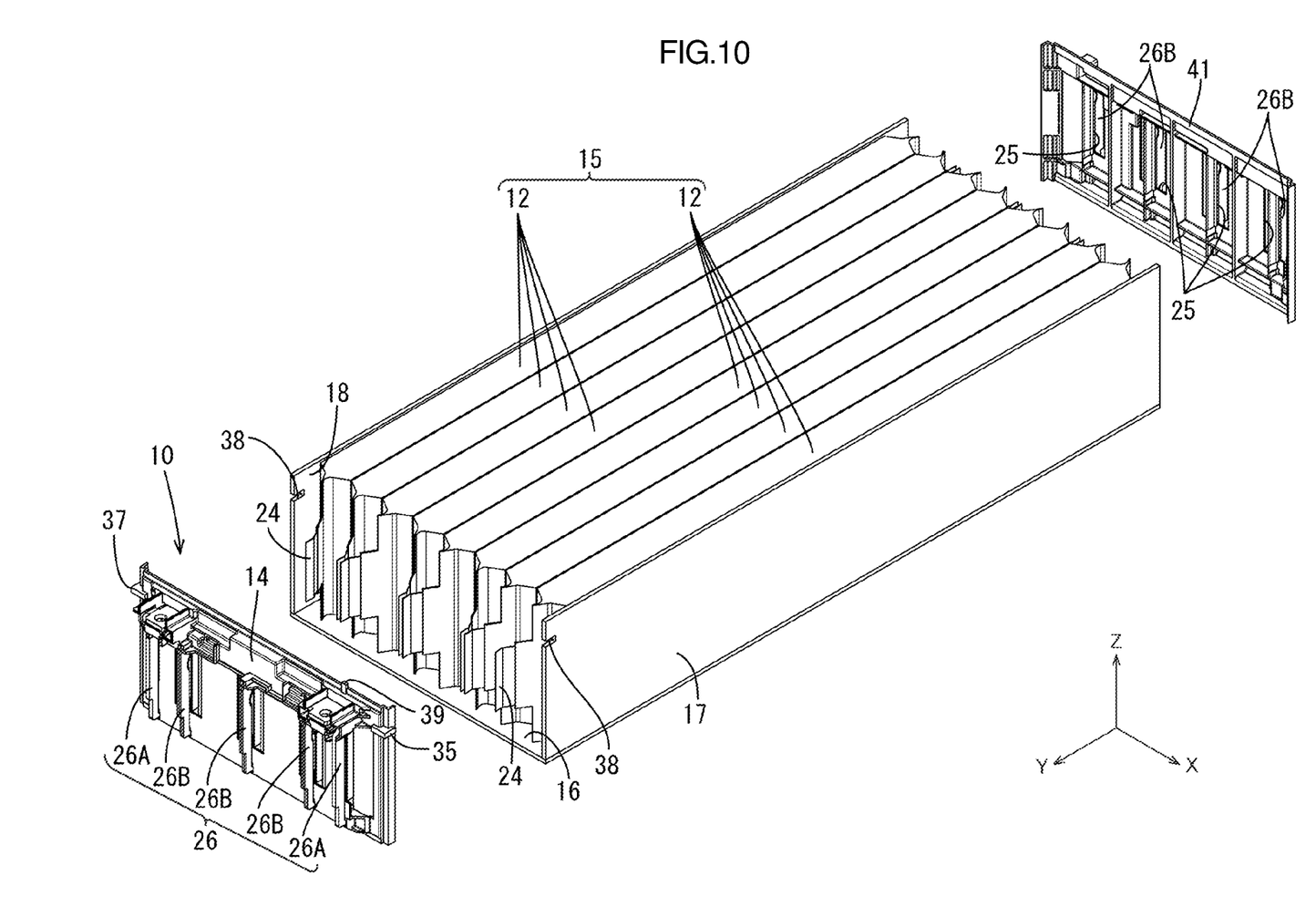
FIG. 10 is a perspective view illustrating a step to attach the wiring module to an electricity storage element group.

As illustrated in FIG. 10, an electricity storage element group 15 including eight electricity storage elements 12 aligned in the left-right direction is contained, from above, in the metal member having the groove shape.

As illustrated in FIG. 10, the front insulating protector 14 is assembled, from the front, with the metal member having the groove shape. At this time, lead terminals 24 are inserted, from the rear, into slits 25 of the front insulating protector 14. A left positioning portion 35 of the front insulating protector 14 recess-projection-fits in a left positioning-receiving portion 36 of a case 13, and a right positioning portion 37 of the front insulating protector 14 recess-projection-fits in a right positioning-receiving portion 38 of the case 13. Thus, the front insulating protector 14 is positioned for the left side wall and the right side wall with respect to the up-down direction.

In the front insulating protector 14, the lead terminals 24 and the output busbars 26A are brought into contact with each other, and the lead terminals 24 and the connection busbars 26B are brought into contact with each other using jigs (not illustrated). In this state, the lead terminals 24 and the output busbars 26A are welded by laser, and the lead terminals 24 and the connection busbars 26B are welded by laser.

As illustrated in FIG. 10, the rear insulating protector 41 is assembled, from the rear, with the metal member having the groove shape. At this time, lead terminals 24 are inserted, from the front, into slits 25 of the rear insulating protector 41.

In the rear insulating protector 41, the lead terminals 24 and the connection busbars 26B are brought into contact with each other using jigs (not illustrated). In this state, the lead terminals 24 and the connection busbars 26B are welded by laser.

Figure 11:
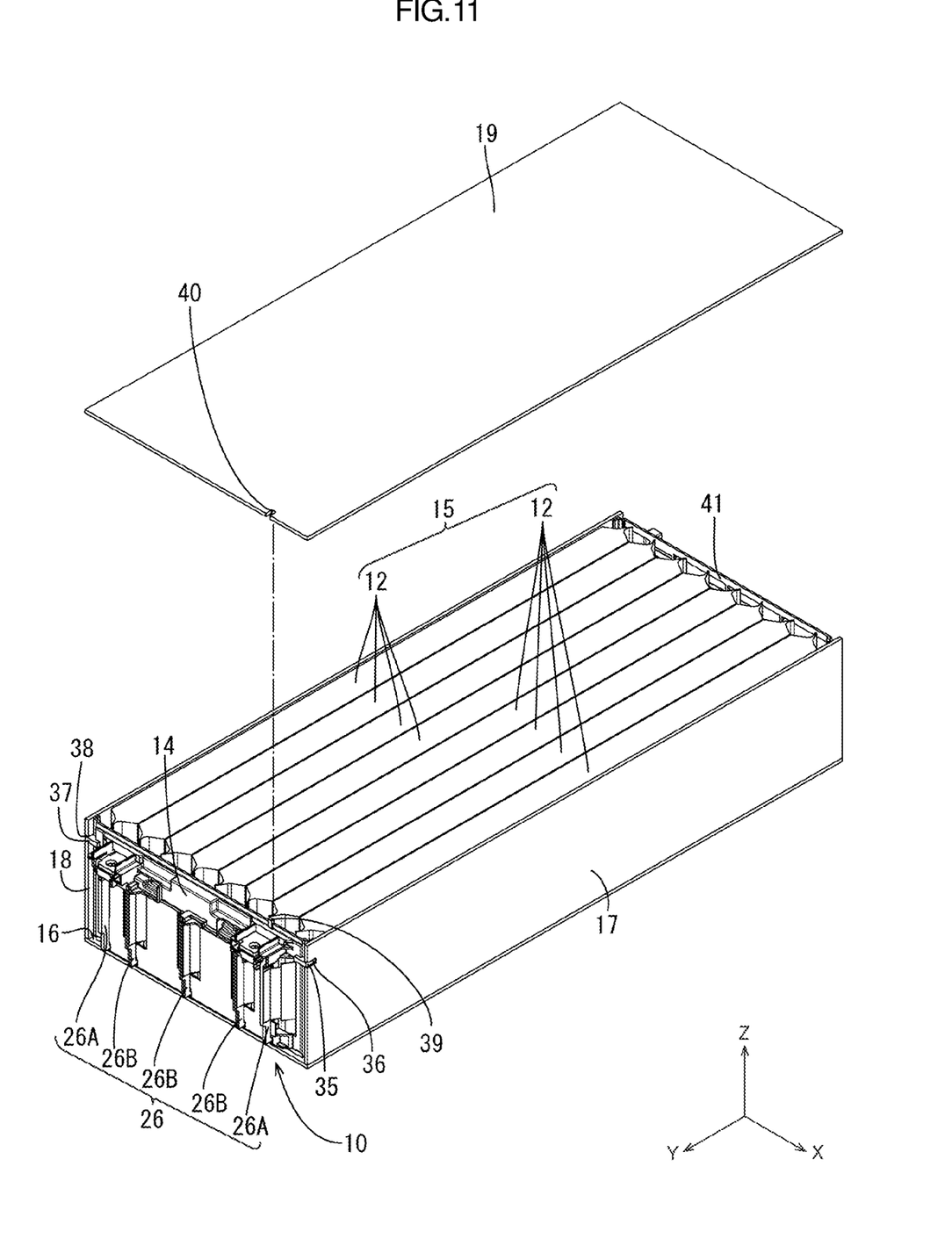
FIG. 11 is a perspective view illustrating a step to attach an upper wall to a left wall and a right wall.

As illustrated in FIG. 11, an upper wall 19 is placed, from above, on an upper end edge of the left wall 17 and an upper end edge of the right wall 18. At this time, an upper positioning portion 39 of the front insulating protector 14 recess-projection-fits in an upper positioning-receiving portion 40 of the upper wall 19. Thus, the upper wall 19 and the front insulating protector 14 are positioned with respect to the left-right direction.

The upper wall 19 and the upper end edge of the left wall 17 are welded by laser, and the upper wall 19 and the upper end edge of the right wall 18 are welded by laser. Thus, a containing portion 13A is formed.

A front lid 21 is assembled with a front end portion of the containing portion 13A. A rear lid 22 is also assembled with a rear end portion of the containing portion 13A.

The front lid 21 is welded by laser to a front end portion of the bottom wall 16, a front end portion of the left wall 17, a front end portion of the right wall 18, and a front end portion of the upper wall 19. Thus, the front insulating protector 14 is held and positioned for the case 13 with respect to the front-rear direction. The rear lid 22 is welded by laser to a rear end portion of the bottom wall 16, a rear end portion of the left wall 17, a rear end portion of the right wall 18, and a rear end portion of the upper wall 19. Thus, an electricity storage module 11 is completed.

As illustrated in FIG. 6, external busbars 33 are connected to the output busbars 26A as follows. End portions of the external busbars 33 are laid on output terminal portions 30 of the output busbars 26A. Bolts 32 are inserted, from above, into through holes 31 and screwed in nuts.

At this time, if in the output busbar 26A at a left end portion of the front insulating protector 14, the bolt 32 is rotated in a direction indicated by an arrow line A (clockwise direction), the left positioning portion 35 of the front insulating protector 14 receives a force in a direction in which the left positioning portion 35 is pulled forward out from the left positioning-receiving portion 36. Since the front lid 21 is in contact, from the front, with the left positioning portion 35, the front insulating protector 14 is prevented from moving forward.

Further, if in the output busbar 26A at a right end portion of the front insulating protector 14, the bolt 32 is rotated in a direction indicated by an arrow line B (clockwise direction), the right positioning portion 37 of the front insulating protector 14 receives a force in a direction in which the right positioning portion 37 is pushed into the right positioning-receiving portion 38. Since the right positioning portion 37 is in contact, from the front, with a rear wall of the right positioning-receiving portion 38, the front insulating protector 14 is prevented from moving rearward.

Operations and Effects of Embodiment

Next, operations and effects of the present embodiment will be described. The wiring module 10 according to the present embodiment is attached to the electricity storage element group 15 including the plurality of electricity storage elements 12 aligned. The wiring module 10 according to the present embodiment includes the plurality of busbars 26 connected to the lead terminals 24 of the plurality of electricity storage elements 12, and the front insulating protector 14 that is insulating, holds the plurality of busbars 26, and is attached to the case 13 containing the electricity storage element group 15. The front insulating protector 14 has the left positioning portion 35, the right positioning portion 37, and the upper positioning portion 39 engaging with the case 13.

The left positioning portion 35, the right positioning portion 37, and the upper positioning portion 39 provided for the insulating protector are engaged with the case 13, so that the front insulating protector 14 can be positioned for the case 13. Thus, the plurality of electricity storage elements 12 held by the front insulating protector 14 can be positioned for the case 13. As described above, according to the present embodiment, the plurality of electricity storage elements 12 can be positioned without using members attached to the plurality of electricity storage elements 12, respectively, to perform the positioning, and thus the number of components can be reduced.

The left positioning portion 35, the right positioning portion 37, and the upper positioning portion 39 are provided in a projection shape from the insulating protector. Provided at positions on the case 13 corresponding to the left positioning portion 35, the right positioning portion 37, and the upper positioning portion 39, respectively, are the left positioning-receiving portion 36, the right positioning-receiving portion 38, and the upper positioning-receiving portion 40 in a recess shape. The left positioning portion 35 recess-projection-fits in the left positioning-receiving portion 36. The right positioning portion 37 recess-projection-fits in the right positioning-receiving portion 38. The upper positioning portion 39 recess-projection-fits in the upper positioning-receiving portion 40.

The insulating protector can be positioned for the case 13 by a simple method in which the left positioning portion 35 is recess-projection-fitted in the left positioning-receiving portion 36, the right positioning portion 37 is recess-projection-fitted in the right positioning-receiving portion 38, and the upper positioning portion 39 is recess-projection-fitted in the upper positioning-receiving portion 40.

The left positioning portion 35 is provided at a left end portion of the insulating protector. The left positioning-receiving portion 36 is provided at the left wall 17 of the case 13. The right positioning portion 37 is provided at a right end portion of the insulating protector. The right positioning-receiving portion 38 is provided at the right wall 18 of the case 13.

The left positioning portion 35 is recess-projection-fitted in the left positioning-receiving portion 36, and the right positioning portion 37 is recess-projection-fitted in the right positioning-receiving portion 38, so that inner walls of the left positioning-receiving portion 36 and the right positioning-receiving portion 38 are in contact, from above and below, with the left positioning portion 35 and the right positioning portion 37. Thus, the insulating protector can be positioned with respect to an up-down direction.

The upper positioning portion 39 is provided at an upper portion of the insulating protector. The upper positioning-receiving portion 40 is provided at the upper wall 19 of the case 13.

The upper positioning portion 39 is recess-projection-fitted in an upper positioning-receiving portion 40, so that inner walls of the upper positioning-receiving portion 40 are laterally in contact with the upper positioning portion 39. Thus, the insulating protector can be positioned with respect to the left-right direction.

The case 13 includes the containing portion 13A having the opening portions 20 that open forward and rearward, and the front lid 21 attached to a front end portion of the containing portion 13A to close the opening portion 20. The front insulating protector 14 is held between the front lid 21 and the containing portion 13A.

The front insulating protector 14 is held between the containing portion 13A and the front lid 21, so that the front insulating protector 14 is positioned with respect to the front-rear direction.

Other Embodiments (1) In the first embodiment, as an insulating protector having positioning portions, instead of the front insulating protector 14 attached to a front end portion of the containing portion 13A, the rear insulating protector 41 attached to a rear end portion of the containing portion 13A may have positioning portions. In this case, the rear insulating protector 41 may be held between the rear lid 22 and the containing portion 13A.

(2) In the first embodiment, the left positioning portion 35 is provided at a left end portion of the front insulating protector 14, and the right positioning portion 37 is provided at the right end portion; however, the front insulating protector 14 does not necessarily have such a configuration. Only the left positioning portion 35 may be provided for the front insulating protector 14, or only the right positioning portion 37 may be provided for the front insulating protector 14.

(3) In the first embodiment, the positioning portions are formed in a projection shape, and the positioning-receiving portions are formed in a recess shape; however, the positioning portions and the positioning-receiving portions do not necessarily have such a configuration. Positioning portions may be formed in a recess shape, and positioning-receiving portions may be formed in a projection shape.

(4) In the first embodiment, the front lid 21 is assembled with a front end portion of the containing portion 13A; however, the front lid 21 may be omitted.

(5) In the first embodiment, the number of the electricity storage elements 12 constituting the electricity storage element group 15 is eight; however, the number may be two to seven, or nine or more.

(6) In a state where the front lid 21 is attached to a front end portion of the containing portion 13A, the front lid 21 may be in contact, from the front, with the upper positioning portion 39.

(7) The electricity storage element 12 according to the first embodiment includes the laminating-film cover 23; however, the electricity storage element 12 does not necessarily have such a configuration. The electricity storage element 12 may include any cover having any shape, such as a cylindrical shape or a rectangular-tube shape. As a material of which the cover is made, any material, such as a metal or a synthetic resin, can be selected.

REFERENCE SIGNS LIST

10: wiring module
11: electricity storage module
12: electricity storage element
13: case
13A: containing portion
14: front insulating protector
15: electricity storage element group
16: bottom wall
17: left wall
18: right wall
19: upper wall
20: opening portion
21: front lid
22: rear lid
23: laminating-film cover
24: lead terminal
25: slit
26: busbar
26A: output busbar
26B: connection busbar
27: holding portion
28: protrusion
29: fixing hole
30: output terminal portion
31: through hole 32: bolt
33: external busbar
34: connection portion
35: left positioning portion
36: left positioning-receiving portion
37: right positioning portion
38: right positioning-receiving portion
39: upper positioning portion
40: upper positioning-receiving portion
41: rear insulating protector

The invention claimed is:

1. A wiring module attached to an electricity storage element group including a plurality of electricity storage elements aligned, the wiring module comprising:
   a plurality of busbars connected to electrodes of the plurality of electricity storage elements; and
   an insulating protector that is insulating, holds the plurality of busbars, and is attached to a case containing the electricity storage element group, wherein
   the insulating protector has a positioning portion engaging with the case,
   the plurality of busbars includes an output busbar electrically connected to an external circuit, and the output busbar has an output terminal portion having an insertion hole in which a bolt is inserted,
   the output terminal portion is disposed such that the output terminal portion protrudes outward from a side edge of the case to which the insulating protector is attached, and
   rotating the bolt inserted in the insertion hole makes the positioning portion of the insulating protector come into contact with the case, so that movement of the insulating protector is prevented.

2. The wiring module according to claim 1, wherein
   the positioning portion is provided in a projection shape or a recess shape from the insulating protector, and
   the positioning portion recess-projection-fits to a positioning-receiving portion provided at a position on the case corresponding to the positioning portion.

3. The wiring module according to claim 2, wherein the insulating protector is provided with a side positioning portion, as the positioning portion, at a side of the insulating protector, and the case is provided with a side positioning-receiving portion, as the positioning-receiving portion, at a side wall of the case.

4. The wiring module according to claim 2, wherein the insulating protector is provided with an upper positioning portion, as the positioning portion, at an upper portion of the insulating protector, and the case is provided with an upper positioning-receiving portion, as the positioning-receiving portion, at an upper wall of the case.

5. The wiring module according to claim 1, wherein
   the case includes: a containing portion having an opening portion that opens forward or rearward; and a lid attached to the containing portion to close the opening portion, and
   the insulating protector is held between the lid and the containing portion.

6. A wiring module attached to an electricity storage element group including a plurality of electricity storage elements aligned, the wiring module comprising:
   a plurality of busbars connected to electrodes of the plurality of electricity storage elements; and
   an insulating protector that is insulating, holds the plurality of busbars, and is attached to a case containing the electricity storage element group, wherein
   the insulating protector has a positioning portion engaging with the case,
   the case includes: a containing portion having an opening portion that opens forward or rearward; and a lid attached to the containing portion to close the opening portion,
   the insulating protector is held between the lid and the containing portion,
   the plurality of busbars includes an output busbar electrically connected to an external circuit, and the output busbar has an output terminal portion having an insertion hole in which a bolt is inserted,
   the output terminal portion is disposed such that the output terminal portion protrudes outward from a side edge of the case to which the insulating protector is attached, and
   rotating the bolt inserted in the insertion hole makes the positioning portion of the insulating protector come into contact with the lid, so that movement of the insulating protector is prevented.

\* \* \* \* \*